B. SMITH.
DISTORTION DEVICE FOR ATTACHMENT TO CAMERAS AND SIMILAR APPARATUS.
APPLICATION FILED DEC. 13, 1916.
1,292,901. Patented Jan. 28, 1919.
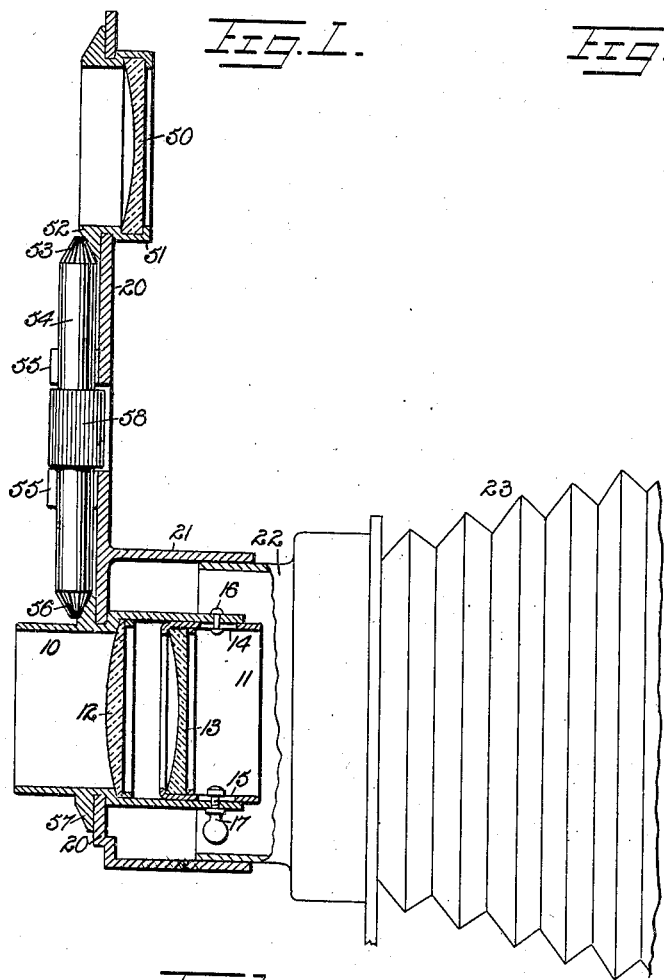
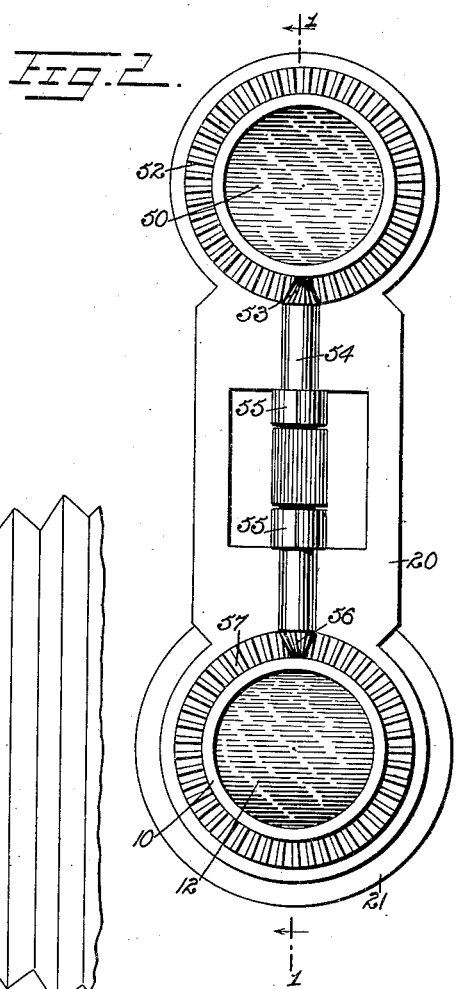
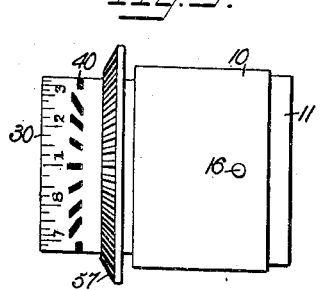
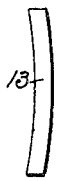
WITNESSES
INVENTOR
Brantley Smith
BY
ATTORNEYS

UNITED STATES PATENT OFFICE.

BRANTLEY SMITH, OF NEW YORK, N. Y., ASSIGNOR OF ONE-HALF TO WILLIAM MORRIS HOUGHTON, OF PLAINFIELD, NEW JERSEY.

DISTORTION DEVICE FOR ATTACHMENT TO CAMERAS AND SIMILAR APPARATUS.

1,292,901.  Specification of Letters Patent.  Patented Jan. 28, 1919.

Application filed December 13, 1916. Serial No. 136,585.

*To all whom it may concern:*

Be it known that I, BRANTLEY SMITH, a citizen of the United States, and a resident of the city of New York, borough of Manhattan, in the county and State of New York, have invented a new and Improved Distortion Device for Attachment to Cameras and Similar Apparatus, of which the following is a full, clear, and exact description.

The object of the invention is to provide a new and improved distortion device for attachment to the objective of a photographic camera, projecting apparatus and other similar apparatus, and arranged to permit the user to take or project a distorted picture of a given object, the nature and degree of distortion being fully under the control of the operator.

In order to accomplish the desired result, use is made of a distortion lens system comprising a plus cylindrical convex lens and a minus cylindrical concave lens.

A practical embodiment of the invention is represented in the accompanying drawings forming a part of this specification, in which similar characters of reference indicate corresponding parts in all the views.

Figure 1 is a sectional side elevation of the distortion device on the line 1—1 of Fig. 2 and shown applied to the objective of the photographic camera;

Fig. 2 is a front view of the distortion device;

Fig. 3 is a plan view of the distortion device with the casing removed;

Fig. 4 is an edge view of the cylindrical convex lens; and

Fig. 5 is a similar view of the cylindrical concave lens.

In the general construction of the distortion device, use is made of tubular lens holders 10 and 11, of which the lens holder 10 is provided with a cylindrical convex lens 12 and the lens holder 11 contains a cylindrical concave lens 13. The lens holder 11 is mounted to slide lengthwise in the lens holder 10 to move the lenses 12 and 13 toward or from each other. The lens holder 11 is provided with diametrically opposite slots 14 and 15, of which the slot 14 is engaged by a rivet 16 held on the lens holder 10 and through the other slot 15 extends a clamping screw 17 for fastening the lens holder 11 in position in the lens holder 10 after the desired lengthwise adjustment is made. The rivet 16 as well as the clamping screw 17 hold the lens holder 11 against turning in the lens holder 10 but they allow lengthwise movement of the lens holder 11 in the lens holder 10.

The lens holder 10 is mounted to turn in the front 20 of a casing 21 adapted to be slipped onto the objective 22 of a photographic camera, projecting apparatus or other apparatus 23 of any approved construction. By the arrangement described the lens carrier 10 can be rotated in the casing 21 so as to move the lenses 12 and 13 in a more or less distorting position relative to an object in front of the camera or other apparatus.

It is understood that the cylindrical convex lens 12 is of plus power and the cylindrical concave lens 13 is of minus power, and in order to obtain the greatest clarity the power of the cylindrical concave lens 13 is approximately one-third greater than that of the cylindrical convex lens 12. Distortion is obtained by separating the lenses 12 and 13 the distance of their focal length so that the image has the effect of being distorted by the forward lens 12 and the distortion brought to a focus by the rear lens in front of the objective of the camera or other apparatus.

It is further understood that the extent of distortion is governed by the power of the lenses and the distance between them. Direction of distortion or sidewise distortion in a plane at a right angle to the axis of the lens system is governed by the turning of the lens holder 10 relative to the objective 22.

It is further understood that by the arrangement described clarity of focus is maintained on turning the lenses as the axes thereof are always in the same plane.

In order to indicate the extent of the distortion use is made of a graduation 30 arranged exteriorly on the forward end of the lens carrier 10, and the marks of the graduation 30 are preferably numbered by consecutive numerals, of which the numeral 1 when on top indicates the normal distortion at the time the axes of the cylinders of the lenses 12 and 13 are in a horizontal plane. Now when it is desired to produce an image distorted sidewise then the carrier 10 is turned in the casing 21 to the right or to the left so that the axes of the cylinders of the lenses 12 and 13 move out of a horizontal plane and the image on the objective 22 to be photographed and refracted by the lenses 12 and 13 appears additionally distorted sidewise to a more or less degree according to the distance the carrier is turned from the first position.

In order to enable the user of the distortion device to more closely identify the nature and degree of the distortion, use is made of a series of four-sided figures 40 associated with sundry of the marks of the graduation 30 on the outer surface of the carrier 10. The figures 40 are disposed in different angles one relative to the other to indicate the degree and direction in which the image will be distorted when the particular figure is on top.

A finder lens 50, preferably of cylindrical concave shape, is held in a carrier 51 mounted to rotate in the upper end of the front 20 of the casing 21. The lens carrier 51 is provided at its front end with a bevel gear wheel 52 in mesh with a pinion 53 formed on the upper end of a vertical shaft 54 mounted to rotate in suitable bearings 55 arranged on the front 20 of the casing 21. The lower end of the shaft 54 is provided with a bevel pinion 56 in mesh with a bevel gear wheel 57 secured to or formed on the lens carrier 10 so that when the shaft 54 is rotated by the operator then the lens carrier 10 is rotated in the casing 21 and a rotary motion in unison is given to the lens carrier 52 in which the finder lens 50 is mounted. Thus the lenses 50, 12 and 13 rotate in unison with each other on turning the shaft 54. The shaft 54 is preferably provided with an enlarged roughened portion 58 to permit the operator to conveniently turn the shaft 54. It is understood that the finder lens and the mechanism for turning the same in unison with the lenses 12 and 13 may be omitted.

In using the distortion device distortion as to the size of the normal distortion is obtained by increasing the distance between the lenses 12 and 13, and sidewise distortion is obtained by rotating the carrier 10 as before explained. It is understood that either of the lenses 12 or 13 may be in front of the other to obtain distortion, but when the cylindrical convex lens 12 is in the front, as shown in the drawings, when a magnifying effect is produced in proportion to the magnifying power of the convex lens.

Although the construction of the lenses 12 and 13 shown in the drawings is the preferred one, that is, the lens 12 is made cylindrical plano-convex and the lens 13 is made cylindrical plano-concave, it is evident that other combinations could be used; for instance, a cylindrical converging plano-convex lens, or a cylindrical converging double convex lens, or a cylindrical converging meniscus lens may be used with a cylindrical diverging plano-concave lens or a cylindrical diverging double concave lens or a cylindrical diverging concave lens, and hence I do not limit myself to the particular construction of the distorting lenses.

It will also be noticed that by the arrangement described distorted and caricatured images may be produced without producing a bowed or curved effect of the images.

By the use of the indicating means described the operator can at once determine the degree of distortion without the use of a separate finder or a ground glass plate.

Having thus described my invention, I claim as new and desire to secure by Letters Patent:—

1. A distortion device for attachment to the objective of a photographic camera, projecting apparatus and like apparatus, comprising two lens carriers slidable one in the other, one of the carriers being mounted to turn, a cylindrical concave lens in one of the lens carriers, and a cylindrical convex lens in the other lens carrier.

2. A distortion device for attachment to the objective of a photographic camera, projecting apparatus and like apparatus, comprising a lens system having a minus cylindrical concave lens and a plus cylindrical convex lens arranged one in front of the other, the lenses having a common longitudinal axis, means for adjusting the lenses toward or from each other for obtaining more or less distortion relative to the size of the object, and means for turning the lens system for additional sidewise distortion.

3. A distortion device for attachment to the objective of a photographic camera, projecting apparatus and like apparatus, comprising a lens system having a minus cylindrical concave lens and a plus cylindrical convex lens arranged one in front of the other, the lenses having a common longitudinal axis, a finder lens having its axis parallel to the common axis of the said distortion lenses and mounted to rotate, and means for rotating the lens system and finder in unison.

4. A distortion device for attachment to the objective of a photographic camera or like apparatus, comprising a casing adapted to be secured on the objective of the camera, a tubular lens carrier mounted to turn in and extending into the casing, a second tubular lens carrier mounted to slide in the first carrier, means for adjusting the second carrier in the first, and means for turning the first lens carrier.

5. A distortion device for attachment to the objective of a photographic camera or like apparatus, comprising a casing adapted to be secured on the objective of the camera and provided with a vertical member at its front, a tubular lens carrier mounted to turn in the casing, a second tubular lens carrier slidably and adjustably mounted in the first carrier, a finder lens carrier mounted to turn in the upper end of the member of the casing, a vertical shaft mounted on the member of the casing and provided with means for operating it, and means for operating the first named lens carrier and the finder lens carrier from said shaft.

6. A distortion device for attachment to the objective of a photographic camera, projecting apparatus and like apparatus, comprising a casing arranged for attachment to the objective of the apparatus, telescoping lens carriers of which one is mounted to turn in the said casing, a cylindrical convex lens mounted in one of the said lens carriers, a cylindrical concave lens mounted in the other lens carrier, a finder lens of the same character as one of the said first-named lenses, a carrier for the said finder lens and mounted to rotate in the said casing, the finder lens and its carrier having an axis parallel to the common axis of the said first-named lenses, and a manually controlled shaft geared with the said finder lens carrier and the said rotatable lens carriers to rotate the lenses in unison.

7. A distortion device for attachment to the objective of a photographic camera, projecting apparatus and like apparatus, comprising a casing arranged for attachment to the objective of the apparatus, telescoping lens carriers of which one is mounted to turn in the said casing, a cylindrical convex lens mounted in one of the said lens carriers, a cylindrical concave lens mounted in the other lens carrier, an annular graduation on the exterior of the outer of the said telescoping lens carriers and adapted to register with a mark on the said casing to indicate the turning movement of the said lens carriers, and a series of four-sided figures on the lens carriers adjacent the graduations and disposed in different angles one relative to the other.

BRANTLEY SMITH.